US009279975B2

(12) United States Patent
Berlips (10) Patent No.: US 9,279,975 B2
(45) Date of Patent: Mar. 8, 2016

(54) ELECTRONICALLY ADJUSTABLE LONG-RANGE OPTICAL DEVICE

(71) Applicant: Carl Zeiss Sports Optics GmbH, Wetzlar (DE)

(72) Inventor: Carsten Berlips, Weilmuenster (DE)

(73) Assignee: Carl Zeiss Sports Optics GmbH, Wetzlar (DE)

( * ) Notice: Subject to any disclaimer, the term of this patent is extended or adjusted under 35 U.S.C. 154(b) by 0 days.

(21) Appl. No.: 14/327,380

(22) Filed: Jul. 9, 2014

(65) Prior Publication Data

US 2015/0015945 A1     Jan. 15, 2015

(30) Foreign Application Priority Data

Jul. 9, 2013 (DE) .................. 10 2013 107 236

(51) Int. Cl.
    *G02B 23/16*     (2006.01)
    *F41G 1/38*     (2006.01)
    *G02B 23/18*     (2006.01)

(52) U.S. Cl.
    CPC *G02B 23/16* (2013.01); *F41G 1/38* (2013.01); *G02B 23/18* (2013.01)

(58) Field of Classification Search
    CPC ........... G02B 23/16; G02B 23/18; F41G 1/38
    USPC ........................................................ 359/425
    See application file for complete search history.

(56) References Cited

U.S. PATENT DOCUMENTS

| 5,619,378 | A | 4/1997 | Schwab |
| 7,113,331 | B2 | 9/2006 | Hirunuma et al. |
| 7,196,844 | B2 | 3/2007 | Steiner |
| 7,268,801 | B2 | 9/2007 | Hirunuma et al. |
| 2001/0028498 | A1 | 10/2001 | Haga et al. |

(Continued)

FOREIGN PATENT DOCUMENTS

| AT | 506 437 A1 | 9/2009 |
| DE | 40 03 976 A1 | 8/1990 |

(Continued)

OTHER PUBLICATIONS

Partial English translation and the Office action of the German Patent Office dated Apr. 7, 2014 in German patent application 10 2013 107 236.4 on which the claim of priority is based.

(Continued)

*Primary Examiner* — Frank Font
(74) *Attorney, Agent, or Firm* — Walter Ottesen P.A.

(57) ABSTRACT

A long-range optical apparatus includes an optical unit defined by lenses and an eyepiece and has at least one manually operable adjusting device for adjusting an optical unit defined by the lenses. With the adjusting device, the optical unit can be adjusted relative to a mounting device. The adjusting device is mechanically coupled to at least one optical element or the mounting device. The optical apparatus has an electronic unit including a memory and the electronic unit performs an electronic function in dependence upon a setting parameter stored in the memory. The adjusting device is coupled with a position detection unit so that actuation of the adjusting device triggers an electrical signal of the position detection unit as a function of the position of the adjusting device. The electronic unit stores or changes a setting parameter in the memory in response to the electrical signal of the position detection unit.

15 Claims, 4 Drawing Sheets

(56) References Cited

U.S. PATENT DOCUMENTS

| | | |
|---|---|---|
| 2004/0095471 A1 | 5/2004 | Heintz |
| 2005/0007662 A1* | 1/2005 | Mogamiya .................... 359/407 |
| 2005/0225854 A1 | 10/2005 | McWilliams |
| 2006/0018012 A1* | 1/2006 | Smith et al. ................... 359/366 |
| 2006/0132908 A1* | 6/2006 | Baun et al. .................... 359/366 |
| 2012/0186131 A1 | 7/2012 | Windauer |
| 2013/0033746 A1 | 2/2013 | Brumfield |
| 2013/0063339 A1 | 3/2013 | Maier |
| 2014/0085717 A1* | 3/2014 | Baun .................... G01S 3/7867 359/429 |

FOREIGN PATENT DOCUMENTS

| | | |
|---|---|---|
| DE | 195 15 531 A1 | 10/1996 |
| DE | 10 2004 054 182 A1 | 7/2005 |
| DE | 103 59 755 A1 | 7/2005 |

OTHER PUBLICATIONS

English translation and the Office action of the European Patent Office dated Nov. 10, 2014 in the corresponding European patent application 14173282.6.

* cited by examiner

ELECTRONICALLY ADJUSTABLE LONG-RANGE OPTICAL DEVICE

CROSS REFERENCE TO RELATED APPLICATION

This application claims priority of German patent application no. 10 2013 107 236.4, filed Jul. 9, 2013, the entire content of which is incorporated herein by reference.

FIELD OF THE INVENTION

The invention generally relates to long-range optical devices, such as binoculars, spotting scopes, and rifle scopes. In particular, the invention relates to electronically adjustable long-range optical devices.

BACKGROUND OF THE INVENTION

DE 40 03 976 A1 describes an electronically controlled camera with zoom lens which can be driven to a tele position by actuating an operational member in a normal direction, and to a wide-angle position by actuating the operational member in the opposite direction. Means are provided for changing the taking mode by a control means, and a display means for displaying the taking mode. The camera further includes a means for manually changing the setting time of a camera shutter and/or the interval time of an interval taking mode when the camera is set in a manual shutter mode or interval mode and the operational member and the taking mode changing means are both operated simultaneously. Adjustment of the optical unit of the camera, zoom and focus is motor-driven. All operational members are configured as electrical switching elements.

DE 19515531 A1 describes an optronic sighting means for handguns which has an optical unit including a plurality of lens groups and a high-resolution CCD device used to generate a video signal of an image of the target area. The sighting means further comprises an electronic unit including an electronic image processing means with a microprocessor, memory, generators for virtual symbols, and components for processing external signals, for processing the video signal from the optical unit, and for generating electric image signals; and a display means on an eyepiece. In order to facilitate and improve the use and operability of such an optronic sighting means, the optical unit can be configured to provide a zoom function and an auto-focus function. The viewing field of the eyepiece has associated therewith at least one sensor of an optical switch which is switchable by changing the viewing direction of an eye with which a user looks into the eyepiece. The zoom function is activated through the viewing direction of the eye.

AT 506 437 B1 describes binoculars including a focusing means for focusing at least a first optical path, and a laser rangefinder. For observation and measuring of the distance of a remote object, the observation device is first directed to the object to target it. Targeting of the object is supported by displaying a target mark. Displaying of the target mark can be triggered by actuating a dedicated key.

U.S. Pat. No. 5,619,378 discloses binoculars including means for optionally observing additional information, with an information carrier or an information deflecting means arranged in the optical path. The information deflecting means can be inserted into the optical path. Insertion of the information deflecting means into the optical path is effected via a control push-button acting on the information deflecting means via a transmitting pivot rod.

United States patent application publication 2001/0028498 discloses binoculars with imaging function, which have a pair of observation optical units including objective lenses and eyepieces, and additionally comprise an imaging device including an imaging optical unit for actualizing a visual field of a field angle such that it is substantially equal to a real field of an image observed through the binocular optical units. A photoelectric converting unit converts an image obtained by the imaging optical unit into an electrical signal. The observation optical unit and the imaging optical unit have individual optical axes different from each other.

The binoculars include operational keys connected to a control unit. Pressing of these keys causes an input to the control unit.

The control unit controls for example the function as an objective lens drive control circuit and an accept of the inputs from the operational keys.

United States patent application publication 2004/0095471 discloses binoculars with imaging and photographing function, in which each tube has an optical path through an objective lens and an eyepiece. Means are provided for extracting a partial light beam, and a module having an image sensor for converting images into digital data, which is mounted on a housing of the tube that contains the means for extracting the partial light beam so that it is possible to extract an optical signal to the image sensor. This permits to capture images through the binoculars using an independent digital camera with an interface for an additional external image sensor. Mechanical displacement of the optical components of the binoculars in front of the image sensor is effected in synchronism with the focusing of the binoculars by the user.

Binoculars with photographing function are further known from U.S. Pat. No. 7,113,331, for example. The focusing of the photographing optical unit is performed manually.

U.S. Pat. No. 7,268,801 also discloses binoculars having a digital camera. The electronic functions are operated via control means on the main body of the binoculars, namely by means of a release switch, a menu key, a recording key, four cursor keys, and an OK or confirmation key.

In the binoculars described in DE 103 59 755 A1 an image capturing sensor is placed into one of the optical paths of the binoculars by means of a mechanical or electric drive, the drive being coupled with a release switch.

U.S. Pat. No. 7,196,844 describes binoculars or a telescope comprising an optical unit having at least two optical components, the distance of which relative to each other being adjustable for focus setting of the optical unit, and an adjustment means which is coupled to at least one of the two optical components for adjusting the distance between the two optical components. A detection means for detecting the position of the optical components relative to one another is in signalling connection with a processor for converting the position data obtained from the detection means into a focal length of the optical unit. Furthermore, an output means is provided which is in signalling connection with the processor for readable display of the converted focal length. The detection means comprises a potentiometer pickoff, for example.

Further, binoculars with additional electronic and optoelectronic functions such as rangefinder, electronic direction meter, inclinometer, altimeter, temperature meter, image recording chip, GPS receiver, wired or wireless interface for data exchange between the binoculars and additional devices are known from DE 10 2004 054 182 A1.

In long-range optical devices such as rifle scopes, binoculars, a spotting scope, etc., more and more electronics are integrated, as becomes apparent from the prior art mentioned above. For operating the electronics, selection of various electronic settings may be required. For appropriate use thereof, more and more keys, buttons, or rotary transducers are necessary. Each additional button on the device requires space, implies additional costs, has to be sealed, and does not necessarily facilitate the operation. Some of the possible settings are not constantly accessed during use.

SUMMARY OF THE INVENTION

It is an object of the invention to provide for easy and comprehensive operation of electronic supplementary functions in long-range optical devices, especially in hand-held long-range optical devices, without having to provide a multitude of electrical keys or other electronic control elements.

Accordingly, the invention provides a long-range optical device having an optical unit including a plurality of lenses and an eyepiece, via which an object can be observed through the eyepiece, the long-range optical device having at least one manually operable adjusting device for adjusting the optical unit, which can be used to adjust at least one optical component of the optical unit including the lenses or the optical unit relative to a mounting device. For this purpose, the adjusting device is mechanically coupled to at least one optical component or to a mounting device. An optical unit or optical system generally refers to the entirety of the optical components of the long-range optical device. The long-range optical device further includes an electronic unit having a memory. The electronic unit is adapted to perform an electronic function based on a setting parameter stored in the memory. The adjusting device is coupled to an electrical position detection unit so that actuation of the adjusting device triggers an electrical signal of the electrical position detection unit as a function of the position of the adjusting device. The electronic unit is further adapted to save or change a setting parameter in the memory in response to the electrical signal of the position detection unit. This means, until the next saving of the setting parameter, the electronic function is changed. Changing of the function may include enabling or disabling thereof.

So, the mechanical adjusting device for adjusting the optical unit is additionally used to change electronic settings. In particular, this relates to settings which are stored in the electronics of the device and therefore are permanently set until the next changing. In other words, the invention is therefore based on the idea to make use of an already existing mechanical-optical adjusting device in long-range optical devices to additionally make electronic settings.

Manually operable adjusting devices particularly contemplated include a focus wheel, a dioptric adjustment, a parallax compensation means, an elevation/windage turret adjusting device, or more generally an adjustment turret adjusting device, a folding bridge, a diaphragm adjusting device, or a zoom adjusting device.

Generally, it is not suitable when the electrical position detection unit is permanently enabled for setting a parameter. Therefore, according to one embodiment of the invention it is contemplated that the electronic unit is adapted to switch into a setting mode in response to an electrical activation signal. Only in this setting mode the electronic unit is enabled to detect an electrical signal of the position detection unit. According to one modification of this embodiment, the electrical signal is generated by an activation means that can be triggered by the user. Such an activation means may for example be a switch on the long-range optical device which is manually operable by one hand. The manually operable switch may be configured as a push-button. Besides a switch or push-button, other activation means that may be triggered by the user are possible, alternatively or additionally. Such activation means may for example include a proximity sensor, which triggers the activation signal by approach of a body part such as a finger. Also possible is a position or motion sensor. In case of a position sensor, the activation signal is triggered by placing the long-range optical device in a particular orientation. For example, the activation signal can be triggered by arranging the long-range optical device upside down, or by placing it on the objective lens. A motion sensor may in particular be configured as an acceleration sensor. In the latter case, the activation signal is triggered by executing a particular movement, for example by shaking the long-range optical device.

According to yet another embodiment, a manually operable switch may be provided via which the setting of the setting parameter is confirmed. This switch may be the same manually operable switch as the aforementioned switch for activating the setting mode. For example, in this case, the electronic unit may be configured to write the setting parameter into the memory in response to an actuation of this switch.

According to an embodiment of the invention, the electrical signal causes the electronic unit to switch to a select or menu mode, preferably by actuating one or more switches on the device, and the electronic unit is adapted to save parameters of different electronic functions in response to one or more further electrical activation signals in combination with one or more electrical signals of the position detection unit.

It is also possible for the further activation signals to be generated by the position detection unit. In case the further activation signals are generated by one or more switches on the long-range optical device, the electronic unit will switch between different selection or menu items when actuating the switches. In case the activation signals are generated by the position detection unit, the selection and menu items may be changed by actuating the adjusting device. Of course, both embodiments may be combined.

In order to be able to easily set the parameter(s) manipulable via the adjusting device, it is furthermore advantageous if the user of the long-range optical device receives a feedback about the change of the electronic settings from the appropriately adapted electronic unit. This feedback is provided via a signaling unit, acoustically and/or visually. The signaling unit is connected to the electronic unit or forms part thereof. The electronic unit is accordingly adapted to signal a change in the setting parameter and/or a change of the electronic settings via the signaling unit.

Particularly preferably, the signaling units include a visual indication which is visible through at least one optical path of the long-range optical device. Such indications or displays are often provided in devices with additional electronic features, such as an integrated rangefinder means, and can be used advantageously for the purposes of the invention. In case the long-range optical device is a binocular device, the indication may be visible either through the optical path of one tube or even through the optical paths of both tubes.

If a position and/or location detection sensor is used, menu navigation may be effected particularly advantageously by motion control. For example, in combination with an electronically controlled visual display which is visible for the user when looking through the long-range optical device, a menu item of a menu or selection structure visible in the display may be selected by moving the long-range optical device, for setting an electronic function of the long-range optical device.

Confirmation of a selection may again be effected via a switch or push-button as a confirmation or activation switch. Such a menu or operational navigation may even be accomplished independently of setting a setting parameter using an adjusting device which is mechanically coupled to at least one optical component or to the mounting device. Therefore, according to a further aspect of the invention, a long-range optical device is provided which has an optical unit including a plurality of lenses and an eyepiece, the long-range optical device further having an electronic unit including a memory. The electronic unit is adapted to perform an electronic function based on a setting parameter stored in the memory. The long-range optical device includes a visual indication, or display, controlled by the electronic unit, which is visible through at least one optical path of the long-range optical device, and wherein at least one position sensor or motion sensor is provided, wherein the electronic unit is adapted to control the visual indication in response to signals from the position sensor or motion sensor in a manner so that upon a change in position or motion a selection or activation of a selection field of a menu displayed by the visual indication is changed.

The invention is particularly suitable for changing basic settings. Basic settings refer to such settings which are not continuously adjusted during operation of the device by the user. The values set may therefore be permanently saved in the memory. Continuous adjustments, by contrast, are caused when focusing, for example.

One example of such basic settings, for example in a long-range optical device with range finder function, is the setting of the ranging information either in feet or yards or meters.

Generally, the electronic unit may be adapted to change at least one of the following setting parameters in response to an actuation of the adjusting device:
general default settings,
a default brightness of a visual indication;
a maximum brightness of a visual indication;
a setting switch for units, for example distance units, such as from meters to feet or yards, or for angular units;
a setting or selection of a ballistic curve;
a time stamp, such as clock time and/or date;
a minimum brightness of a visual indication;
brightness levels of a visual indication;
radio transfer settings, in particular settings for wireless transmission and/or wireless reception of data.

Here, general default settings in particular refer to mechanical adjustments depending on the type of device, which are adjustable electrically, preferably in motor-driven manner. Such adjustments may include:
default focusing, in particular an adjustment of the focus to infinite focal length;
setting of dioptric compensation to zero;
setting of the elevation and/or windage of a reticle device to zero.

Especially in case of rather complex settings or a selection of menu items it makes sense to effect settings using two adjusting devices. For example, in this manner a first adjusting device may be used to select a menu item, or a selection of a specific electronic function, and a second adjusting device may be used to select the desired parameter of this function. That means, the selection of a parameter is effected here using the two adjusting devices for adjusting the optical unit. Therefore, in one modification of the invention, a second manually operable adjusting device is provided for adjusting the optical unit of the long-range optical device, the second adjusting device being coupled to a second electrical position detection unit in a manner so that actuation of the second adjusting device triggers an electrical signal of the second electrical position detection unit as a function of the position of the second adjusting device. In this case, the electronic unit is adapted to save or change a setting parameter in the memory in response to the electrical signals from the two position detection units.

In the simplest case, the position detection unit may include a switch. A switch having two position dependent switching states may for example be used to make a selection from two possible parameter values. An example would be the change from meters to feet mentioned above. It is also possible to use a sliding contact switch, in particular one that has a plurality of switching contact surfaces, for making a more complex selection. Other possibilities are potentiometers and incremental transducers.

It is also possible to use an optical, magnetic, or capacitive sensor. The latter sensors permit in a simple manner to make a selection and/or adjustment of the setting parameter in continuous manner or at least with very fine increments.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
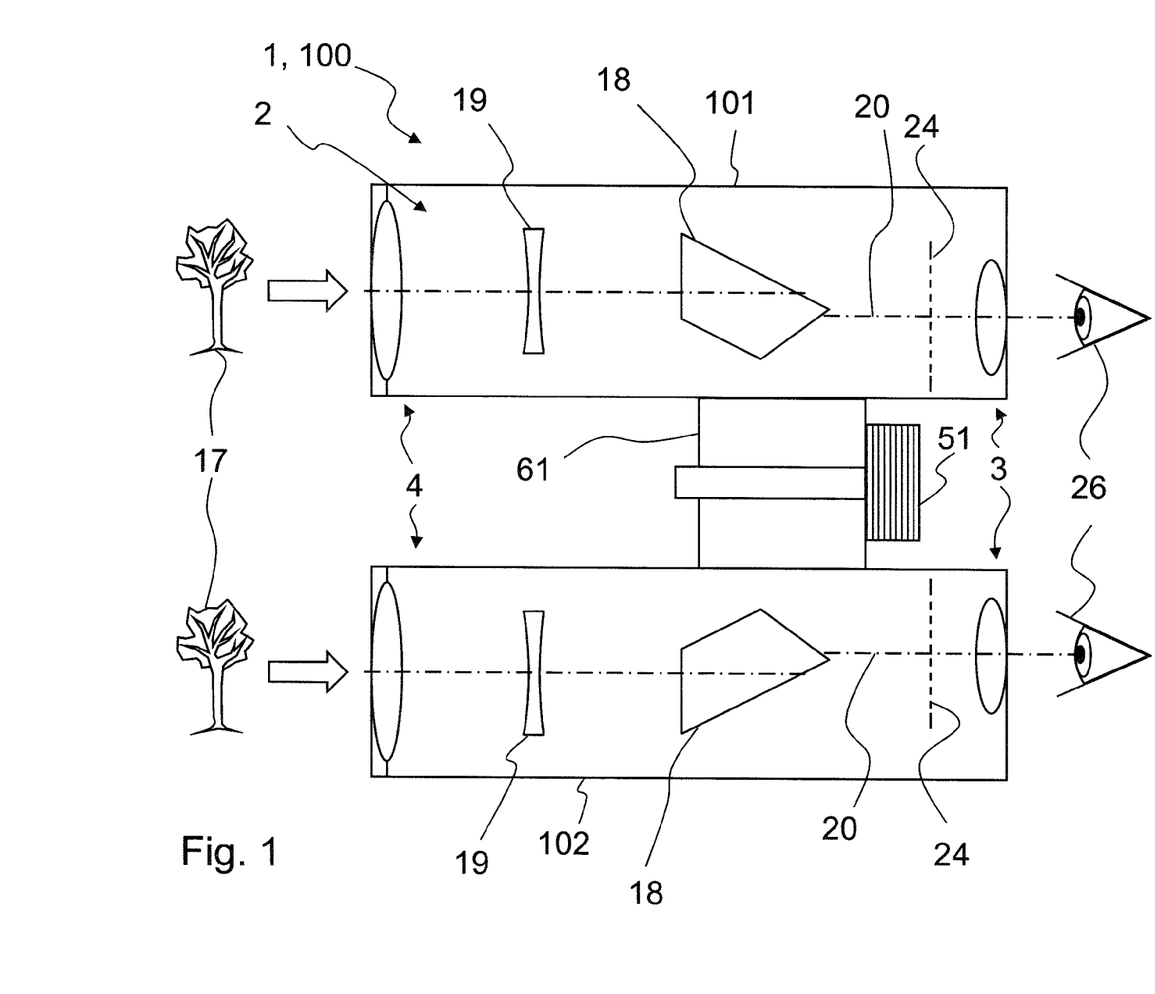
FIG. 1 shows a binocular device.
Figure 2:
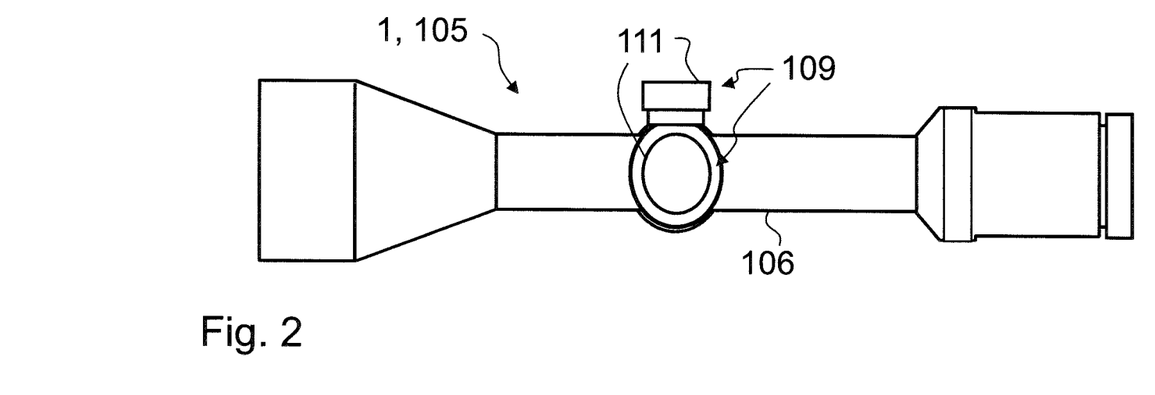
FIG. 2 is a view of a rifle scope.
Figure 3:
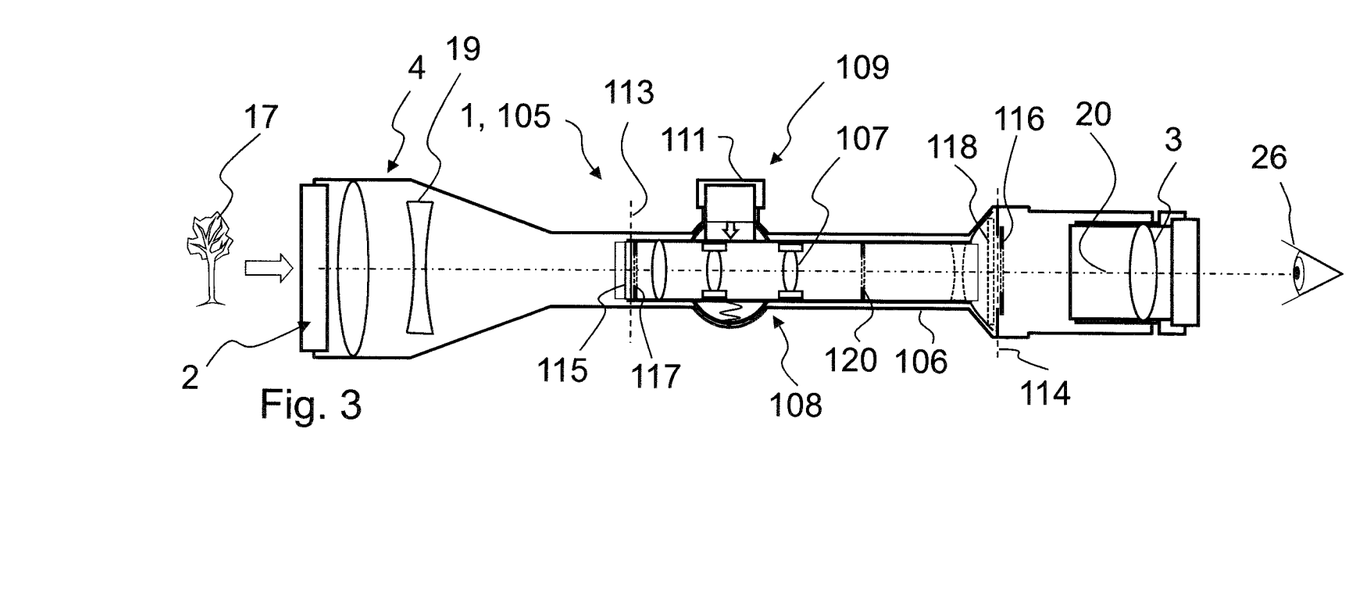
FIG. 3 is a schematic sectional view of the rifle scope shown in FIG. 2.

FIGS. 1, 2, and 3 show two exemplary long-range optical devices 1 in which the invention may be implemented. FIG. 1 shows a binocular device, or binoculars 100.

A binocular device 100 has two tubes (101, 102) in parallel to one another, each of which includes an optical system, or optical unit 2.

The optical system or optical unit refers to the entirety of optical components of each of the tubes (101, 102), and in the example of FIG. 1 it includes at least one objective lens 4, an aperture stop, a prism system 18, and an eyepiece 3. Objective lens 4 and eyepiece 3 define a respective optical axis 20.

The objective lens 4 may include several individual lenses or cemented components.

For the purposes of focusing an object 17 observed through the binocular device 100, either the eyepiece 3 may be shifted axially, or the entire objective lens may be shifted axially, or a lens group which is part of the objective lens may be shifted axially. This lens group is usually disposed between the objective lens and the prism system 18 and may be referred to as a focusing lens 19. For focusing, a rotary knob or adjusting wheel 51 may be arranged on a central axis and can be used for together axially displacing focusing lenses 19.

Objective lens 4 is able to generate a real image which is upside-down relative to the object 17 being observed, in an image plane associated with objective lens 4. For the purposes of image erection, prism system 18 may be configured according to Abbe-König, Schmidt-Pechan, Uppendahl, Porro, or according to another prism system variation. Prism system 18 erects the upside-down image and displays it in a new image plane, the intermediate image plane 24.

In intermediate image plane 24 there may be arranged a field stop sharply limiting the visual field.

The eyepiece 3 may be used to display the image of the intermediate image plane 24 in any distance, for example to infinity or at an apparent distance of one meter.

A beam direction may be defined by the order of: object 17—objective lens 4—prism system 18—eyepiece 3—eye 26. The optical axis of the objective lens may be laterally offset from the optical axis of the eyepiece, due to an optical path offset caused by the prism system.

Tubes (101, 102) are either connected to each other by at least one two-part bridge or folding bridge 61 via the central axis, or are fixedly arranged relative to one another in a common housing.

If the at least one two-part bridge or folding bridge 61 is provided, a user's interpupillary distance may be accommodated by folding the bridge. In case of a common housing, the user's interpupillary distance is for instance adjusted by means of rhombic prisms which are arranged behind the prism system when looking in the beam direction, and in this case the eyepieces will follow a pivoting of the rhombic prisms.

The aperture stop may be formed either by a frame of an optical component or may be defined by a separate diaphragm. It may be imaged in a plane that is behind the eyepiece, typically with a spacing from 5 to 25 mm thereto, by the rest of the optical unit that follows in the beam direction. This plane may be referred to as an exit pupil plane. A vision defect of the user may be accommodated by a diopter compensation. For this purpose, the axial positions of focusing lenses 19 of the two tubes (101, 102) may be adjustable relative to each other by the user, for example. Another possibility is to provide for altering the axial positions of eyepieces 3 relative to each other.

To protect the user against lateral incident light, eyepieces 3 may be equipped with extendable, screw-out, or folding eyecups.

Furthermore, a binocular device 100 may include additional optical components, for example for image stabilization, beam input or extraction, or for photographic purposes. Also, electronic components, control elements, or energy storage necessary for the mentioned purposes may be provided. According to the invention, functions of the electronic components are configured by existing mechanical control elements, such as the adjusting wheel 51 shown in the example of FIG. 1.

Binocular device 100 may be equipped with holding means, usually at the lateral sides thereof, which can be used to attach a carry strap, for example.

FIG. 2 is a view of a rifle scope 105 as another example of a long-range optical device 1. FIG. 3 schematically illustrates a sectional view of the rifle scope 105 shown in FIG. 2.

A rifle scope 105 generally has one tube 106 or tubular case that has sections of different diameters and includes an optical system or optical unit 2.

In a front section which is usually thickened, an objective lens 4 may be arranged. In a central section often referred to as a central tube, adjustable optical components 107 may be arranged. Additionally, external adjustment turrets 109 are provided there, which have a rotary element 111 used to change optical properties of the optical system. In a rear section which is usually thickened, an eyepiece 3 may be arranged. The optical system or optical unit 2 includes at least one objective lens 4, a lens erection system 108, a reticle, and an eyepiece 3, as the optical components. The optical system defines an optical axis 20.

Objective lens 4 may include a plurality of individual lenses or cemented components.

For the purposes of focusing an object 17 observed through rifle scope 105, or for compensating a vision defect of a user, either the eyepiece 3 may be shifted axially, or the entire objective lens may be displaced axially, or a lens or lens group which is part of the objective lens 4 may be displaced axially. This lens or lens group is usually disposed between objective lens 4 and lens erection system 108 and may be referred to as a focusing lens 19.

Objective lens 4 is able to create a real image which is upside-down with respect to the object 17 being observed, in a first image plane 113 conjugated with respect to the object 17. The axial position of this image plane 113 depends on the focal length. By using the focusing lens, the axial position of the image plane 113 may be influenced. For the purposes of image erection, lens erection system 108 may include a fixed lens group or may include at least two axially movable zoom elements. Lens erection system 108 erects the upside-down image and displays it in a new image plane, the second image plane 114, with a specific image scale. Other lens groups, such as a field lens or Barlow lens, may be located between the first and second image planes. All of the optical components mentioned may have frames.

A field stop 115 and a reticle 117 may be located near or in the first image plane 113 conjugated to an infinitely distant object 17. Usual reticles are glass reticles or etched foil reticles, for example.

If lens erection system 108 includes at least two axially movable zoom elements, as in the illustrated example of FIG. 3, the latter perform an additional function, besides the task to image a reversed image of the image in the first image plane in the second image plane, namely to provide for continuous adjustability of total magnification of the image perceived by the user, in a mechanically limited range. In this case, lens erection system 108 continuously varies its imaging scale between the first image plane 113 and the conjugate second image plane 114.

Again, a field stop 116 and a reticle 118 may be located near or in the second image plane 114. Usual reticles are glass reticles or etched foil reticles, for example.

A point near the first or second image planes, 113 and 114, respectively, means a location which is offset along the optical axis by not more than a fifth, preferably not more than a tenth of the focal length of the relevant optical subsystem focusing onto the image plane. If, for example, field stop 115 is axially offset relative to the image plane towards objective lens 4, this offset should be less than $\frac{1}{5}$, preferably less than $\frac{1}{10}$ of the objective lens' focal length.

Reticle(s) (117, 118) define(s) a target line. For this purpose, the reticle has at least one target point which the user matches with the object. To compensate for bullet drop, side winds, and the like, the user may change the target line by means of adjustment turrets 109. To obtain a parallax-free image in rifle scopes with higher magnification regardless of the focal length (which is to say that the target does not shift relative to the object 17 upon a lateral movement of the eye 26), and with the image as sharp as reticle (117, 118), the user may use the focusing lens.

A zoom position is colloquially for any magnification adjustment within the mechanically possible magnification adjustment range of the rifle scope 105.

A zoom factor is the ratio of two magnifications, the larger one being the numerator. A maximum zoom factor is the ratio of the mechanically possible maximum magnification and the mechanically possible minimum magnification of the rifle scope 105, with the larger one being the numerator. The eyepiece 3 can be used to display the image of the second image plane 114 in any distance, for example to infinity, or in an apparent distance of one meter, or to focus on reticle (117, 118). A beam direction may be defined by the order of: object 17—objective lens 4—lens erection system 108—eyepiece 3—eye 26.

The frames of the optical components or the viewing field stop near the second image plane 114 are limiting the subjectively perceived visual field, depending on the magnification settings.

An effect referred to as tunnel effect is observed when zooming from the mechanically possible maximum magnification to the mechanically possible minimum magnification, while the viewing field limitation changes from the field stop near the second image plane 114 to a frame of another optical component or a diaphragm in front of the second image plane 114, causing the subjective visual field to decrease.

An aperture stop may either be defined by a frame of an optical component, or may be formed by a separate aperture stop 120. Depending on the magnification setting, the aperture stop may also be defined by another frame of an optical component, and may be imaged, by means of the rest of the optical system that follows in the beam direction, in a plane that is behind the eyepiece 3 and is typically spaced therefrom by 70 to 100 mm. This plane may be referred to as an exit pupil plane.

The region behind the eyepiece 3 in which the user has to place his eye 26 in order to survey the entire visual field is referred to as eye relief area, or eyebox.

A vision defect of the user may be taken into account by a diopter compensation. For this purpose, the axial position of the eyepiece 3 may be varied.

A rifle scope 105 may further include additional optical components, such as for purposes of reticle illumination, beam input or extraction, for example for range finding or photographic purposes. Also, electronic components, sensors, control elements, or energy storage necessary for the mentioned purposes may be provided. According to the invention, mechanical control elements, such as the rotary elements of the adjustment turrets, or a reticle adjusting device are used to configure the electronic functions.

Figure 4:
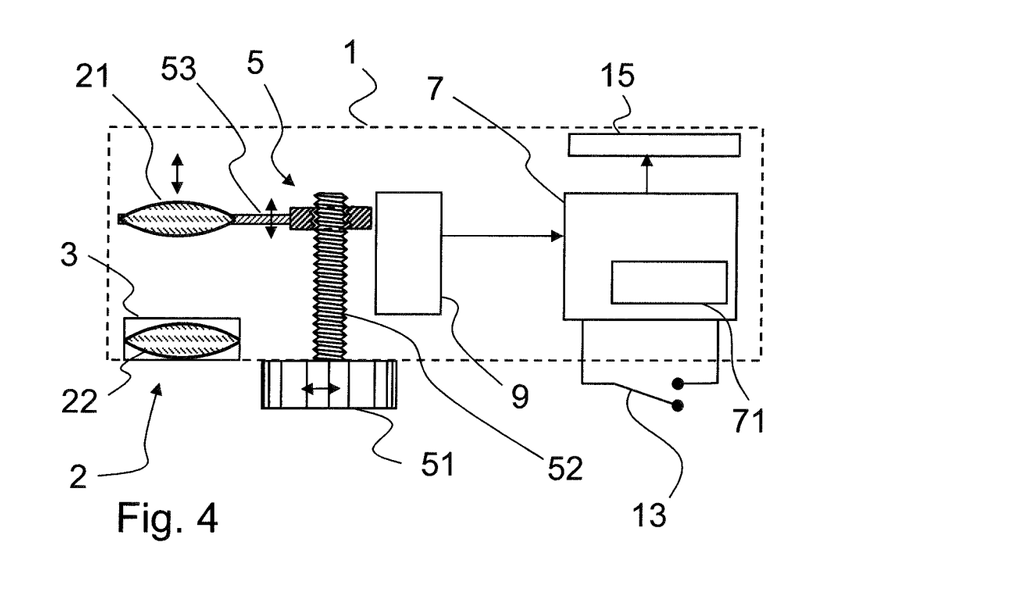
FIG. 4 schematically illustrates components of a long-range optical device according to the invention.

FIG. 4 schematically illustrates a long-range optical device 1 including the components according to the invention. Long-range optical device 1 has an optical unit 2 including a plurality of lenses (21, 22), via which an image is observable through an eyepiece 3.

For focusing optical unit 2 to a specific object distance, for example, long-range optical device 1 has at least one manually operable adjusting device 5 for adjusting the optical unit 2, via which at least one optical component is adjustable. In the example shown in FIG. 4, this is lens 21.

The coupling of adjusting device 5 to the optical component, that is lens 21 in the present example, is of mechanical nature. Specifically, in the example shown, the manually operable adjusting device 5 includes a manually operated rotary knob, or a manually operated adjusting wheel 51 with a threaded rod 52. As a further component of adjusting device 5, a transmission arm 53 threaded in correspondence to threaded rod 52 runs on the threaded rod, so that when the adjusting wheel 51 is turned, the transmission arm is moved in the axial direction of threaded rod 52. Lens 21 is mounted to transmission arm 53 and can be moved in accordance with transmission arm 53 in the axial direction of adjusting wheel 51 and of threaded rod 52 when turning adjusting wheel 51.

Long-range optical device 1 includes an electronic unit 7 with a memory 71. Memory 71 stores various parameters of the electronic functions to be performed by the electronic unit 7, for example control or calculating functions. Accordingly, electronic unit 7 is adapted to perform one or more electronic functions based on at least one setting parameter stored in memory 71.

Furthermore, an electrical position detection unit 9 is provided which is coupled to adjusting device 5, so that upon actuation of adjusting device 5 an electrical signal is generated as a function of the position of adjusting device 5. Based on the electrical signal, a setting parameter is then saved in memory 71. The electronic function which accesses this setting parameter is accordingly changed by actuation of the adjusting device 5, and this change of the function may even include enabling or disabling thereof. Therefore, without limitation to the exemplary embodiment, the electronic function is permanently altered, enabled or disabled, until a next saving of the setting parameter. The change of the setting parameters and therefore also of the electronic function is effected according to the invention through actuation of adjusting device 5 which is at the same time used to move the optical component, that is lens 21 in the present example.

Generally, it will not be suitable if the setting of the setting parameter is continuously enabled, because adjustment means 5 is frequently actuated during normal operation.

Therefore, it is contemplated that the electronic unit 7 is adapted to switch to a setting mode in response to an electrical activation signal, and in this setting mode the electronic unit 7 is enabled to detect an electrical signal of position detection unit 9.

In the long-range optical device 1 schematically illustrated in FIG. 4, a manually operable switch 13 is provided for this purpose, via which the electrical signal can be generated. When switch 13 is actuated, electronic unit 7 switches into the setting mode. This may be time-controlled, for example by requiring the switch 13 to be pressed for a certain time to activate the setting mode.

If now the adjusting device 5 is actuated, in the illustrated example by turning adjusting wheel 51, the setting parameter of the electronic function will be altered as a function of the position, that is in the present example as a function of the rotational position of adjusting wheel 51. To provide a feedback to the user about the current value of the setting parameter, a visual and/or acoustic signaling unit 15 is connected to electronic unit 7, which signals the user a change in the electronic settings, or of the setting parameter. Once the user has set the desired setting parameter by actuating adjusting device 5 and feedback through signaling unit 15, the setting parameter may subsequently be saved in memory 71.

Position detection unit 9 may, in particular, be a sensor which detects the position of a movable part of adjusting device 5 to convert it into an electrical signal. For example, a magnetic sensor may be provided measuring the inductance which is influenced by the position of a portion of adjusting device 5. For example, the inductance of a coil of the sensor may be changed by the position of transmission arm 53. In similar manner, a capacitive measurement of the position of transmission arm 53 may be effected by the sensor.

Figure 5:
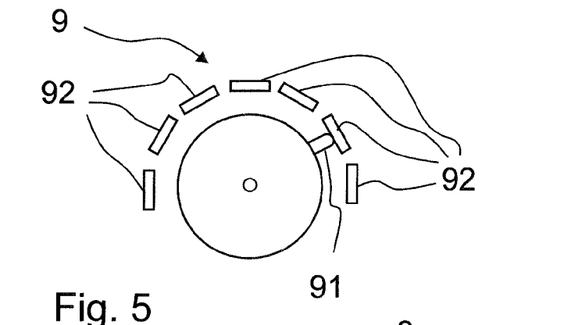
FIG. 5 shows an embodiment of a position detection unit in form of a switch having a plurality of switching surfaces.

According to another embodiment illustrated in FIG. 5, position detection unit 9 may be formed as a switch having a plurality of contact surfaces 92. Adjusting device 5, for example adjusting wheel 51, may be provided with a slider or sliding contact 91 via which an electrical contact is established to one of contact surfaces 92 in function of the position. Each closed switch position of the multiple switch thus defined may be associated with a specific value of the setting parameter, by electronic unit 7.

The signaling unit 15 may in particular be a visual indication 150. According to an advantageous embodiment of the invention, this visual indication 150 is visible through at least one optical path of the long-range optical device 1. So by looking through the or one of the eyepiece(s), the user may see the indication.

According to an alternative or additional embodiment, a display may optionally be arranged outside the optical path of the device, for example in form of a display built into the housing or arranged at the housing.

Figure 6:
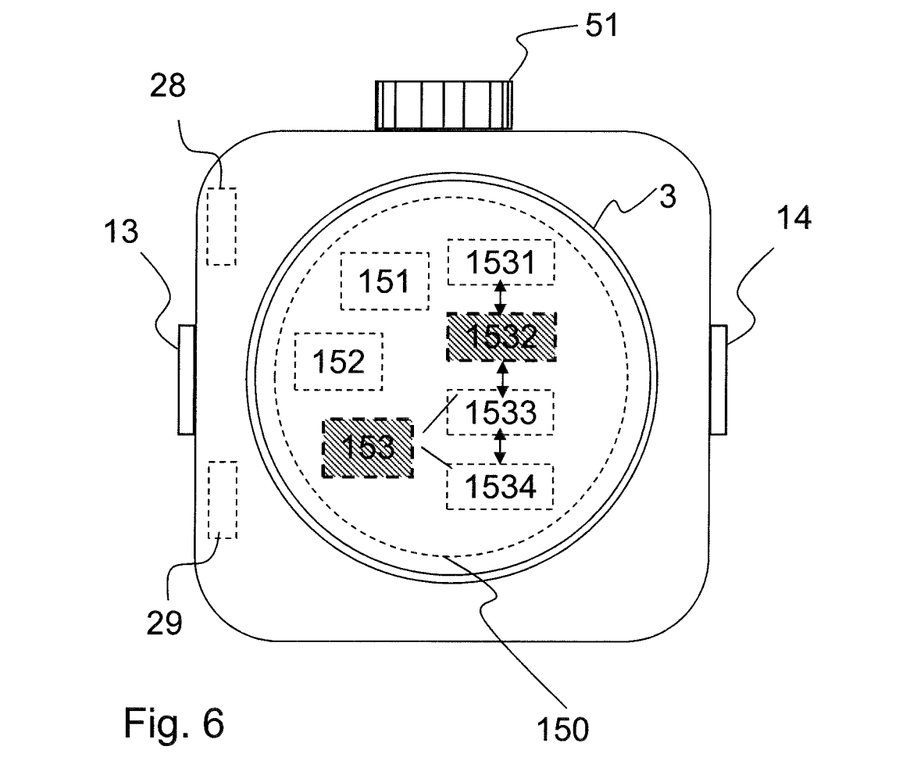
FIG. 6 is a plan view of the eyepiece 3 of a long-range optical device 1.

FIG. 6 schematically shows a plan view of the eyepiece 3 of a long-range optical device 1, with visual indication 150 being visible through the eyepiece 3. Preferably, the indication 150 is configured so that the user of the device at the same time sees the image displayed through the objective lens. For example, for this purpose, the visual indication 150 may be superimposed by means of a beam splitter. Thus, display 150 itself will not be in the optical path.

The invention permits to configure several or rather complex settings of the electronics without a need for multiple additional switches, as is illustrated by the example of FIG. 6. When the user actuates switch 13, electronic unit 7 will switch to a select mode in response to the electrical signal from switch 13. In this select mode, indication 150 displays several menu items (151, 152, 153), which are visible to the user through eyepiece 3. For each of these menu items (151, 152, 153) a setting parameter of an electronic function can be selected, or the menu item contains a submenu of selectable setting parameters.

According to one embodiment of the invention, the electronic unit 7 is adapted to save parameters for various electronic functions in response to one or more further electrical activation signals in combination with one or more electrical signals of the position detection unit 9.

As in the embodiment of FIG. 4, adjusting wheel 51 is a component of manually operable adjusting device 5 which is coupled to the position detection unit 9.

The activation signals mentioned above are used to switch between the individual menu items (151, 152, 153). These activation signals may be generated by actuating switch 13 and/or by actuating the adjusting wheel and therefore by position detection unit 9. Otherwise than illustrated in FIG. 6, it is also possible for the menu items (151, 152, 153) to be sequentially displayed in display 150 when successively actuating adjusting wheel 51 and/or switch 13.

To give an example, a binocular device 100 or a rifle scope 105, such as described with reference to FIGS. 1 to 3, may be equipped with a rangefinder and a ballistics information system. Menu item 152, for example, provides for a selection of the ranging information, optionally in meters, yards, or feet. Menu item 153 currently selected in FIG. 6 permits selection of different ballistic curves for the Ballistic Information System. The ballistic curves may be selected by selecting setting parameter selection fields (1531, 1532, 1533, 1534), and may be saved in memory 71. Selecting is done by actuating adjusting device 5 via adjusting wheel 51, or in case of the rifle scope by a rotary element 111 at one of adjustment turrets 109 as exemplified in FIG. 2 and FIG. 3. In the example shown in FIG. 6, the ballistic curve associated with setting parameter selection field 1532 has currently been selected. That is, as stated above, a specific setting parameter, namely here the ballistic curve according to selection field 1532, is set by a combination of one or more further electrical activation signals, here for choosing one of menu items (151, 152, 153), in combination with one or more electrical signals from position detection unit 9 for selecting setting parameter selection fields 1531-1534.

To save the selected setting parameter, the choice of the setting parameter may be confirmed by actuating manually operable switch 13. It is also possible that for confirmation purposes a separate switch 14 is provided in addition to switch 13 intended for activation. By confirming the choice using switch 13 or an additional switch 14, depending on the embodiment, the setting parameter for the associated ballistic curve is then written into memory 71, and/or the menu item is exited. Alternatively or additionally, a position sensor 28 and/or a motion sensor 29 may be provided, in particular an acceleration sensor, to select the menu items. Thus, the menu tree displayed by way of example by visual indication 150 in FIG. 6, or the structure of menu items (151, 152, 153) and selection fields 1531-1534 may then be wandered through in a simple and very ergonomic way by moving the long-range optical device or changing the position thereof. If, for example, one intends to change from selection field 1531 to selection field 1532 which is arranged further down in the tree structure, the long-range optical device may be swiveled downwards, for example. This change in position or motion will be detected by position sensor 28 and/or motion sensor 29 and evaluated by the electronic unit so that the latter will respond with a corresponding change of the selection of selection fields and will relay this to visual indication 150. Such a menu navigation may also be provided without that one has to set a setting parameter by means of manually operable adjusting device 5, such as adjusting wheel 51. Therefore, this embodiment may also be implemented in a long-range optical device 1 with electronic functionality, in which an electronic function cannot be set by means of manually operable adjusting device 5 mechanically coupled to an optical component.

The confirmation of a selection of a selection field 1531-1534 may also be made through a suitable movement and feedback via one of sensors (28, 29). However, a confirmation by means of one of the manually operable switches (13, 14) is preferred. Accordingly, electronic unit 7 is adapted to control visual indication 150 in response to signals from position sensor 28 and/or motion sensor 29 so that upon a change in position or motion a selection or activation of a selection field 1531-1534 of a menu displayed by visual indication 150 is altered. Menu items (151, 152, 153) are likewise selection fields, in the sense of the invention.

With this embodiment of the invention, alternatively or in addition to the setting of a setting parameter by means of a manually operable adjusting device 5, such setting parameters may also be set by changes in position or motion. In this way, a setting parameter may easily be adjusted even continuously or at least with fine increments, by panning, tilting, or turning. In the exemplary embodiments illustrated in the figures so far, the setting of electronic functions was made using one manually operable adjusting device 5. Often, however, more than one adjusting device is provided on a long-range optical device. Accordingly, in one embodiment of the invention at least two of these adjusting devices can be used simultaneously for setting one or more different electronic functions. In this way even rather complex settings may easily be effected without requiring a multitude of additional switches or of other electrical adjusting elements to be separately provided on the device.

Figure 7:
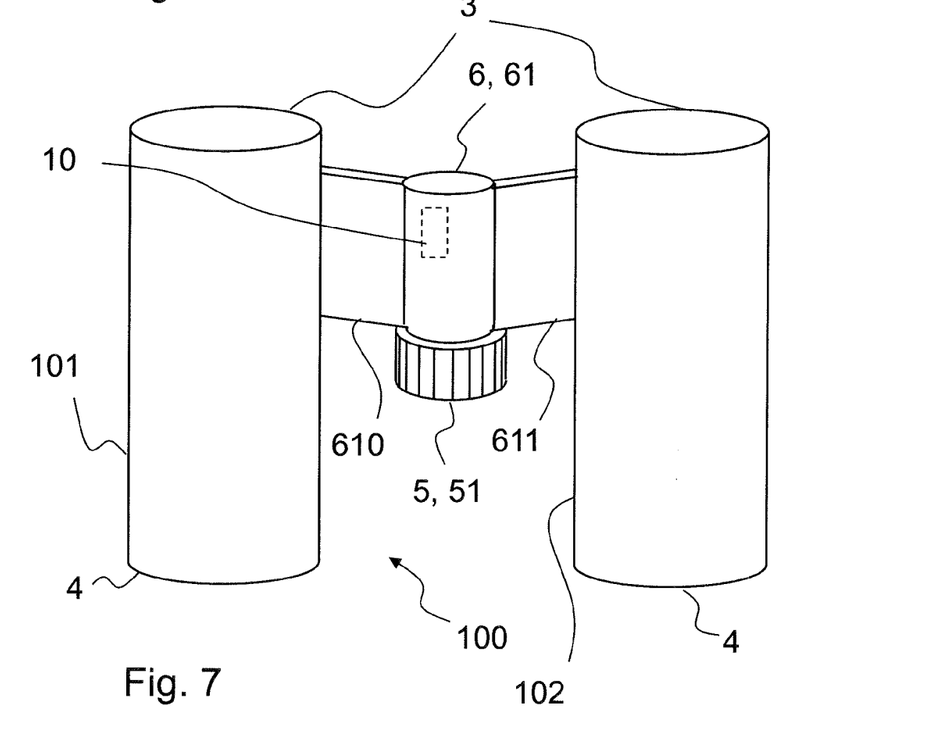
FIG. 7 is a binocular device having two manually operable adjusting devices; and,
FIG. 8 shows a spotting scope with one adjusting device on a mounting device.

FIG. 7 shows an exemplary embodiment of the invention in form of binoculars 100 which include a second manually operable adjusting device 6 for adjusting the optical unit of the long-range optical device 1. In detail, binoculars 100 may in particular be configured like the binoculars illustrated in FIG. 1. In the illustrated example, the focusing means of binoculars 100 actuatable via adjusting wheel 51 serves as a first adjusting device 5. As with the example shown in FIG. 4, a sensor may be provided as a first position detection unit 9, which detects the position of a transmission arm and converts it into an electrical signal. The transmission arm may for example be coupled with a lens of the objective lens 4 of one or both tubes (101, 102). As a second manually operable adjusting device 6 a folding bridge 61 may be used, for example. Folding bridge 61 is used to modify the spacing of the two tubes (101, 102) and hence the distance between the two optic units arranged in the two tubes (101, 102).

A second electrical position detection unit 10 is coupled with folding bridge 61 so that actuation of the second adjusting device 6, that is to say a modification of the angle between the two arms (610, 611) of folding bridge 61, triggers an electrical signal of the second electrical position detection unit 10 as a function of the position of second adjusting device 6. Electronic unit 7 saves or changes a setting parameter in memory 71 as a function of the electrical signals of the two position detection units (9, 10). Transferred to the example shown in FIG. 6 this means that navigation between menu items (151, 152, 153) may be effected by actuating folding bridge 61, for example. Selection of the setting parameter, such as a ballistic curve according to setting parameter selection fields 1531-1534, may then be performed by actuating adjusting wheel 51. Again, an indication 150 may be provided, which is visible through the eyepiece.

Figure 8:
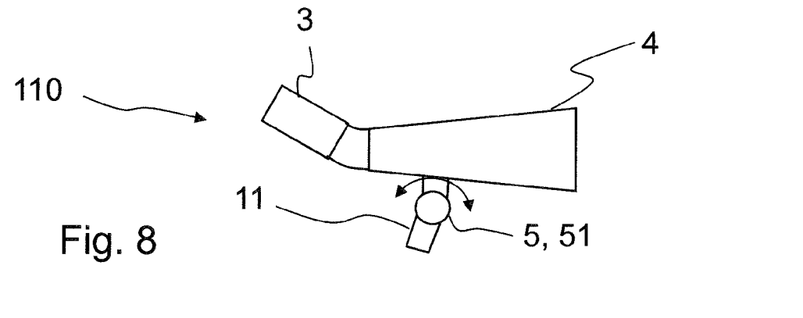

In the examples shown so far, the position of the optical components has been changed relative to one another by means of the respective adjusting device. This is also the case with folding bridge 61, since the spacing of the tubes and thus the spacing of the lenses between first tube 101 and second tube 102 is modified. However, optionally adjusting devices may be provided which alter the optic unit as a whole relative to a mounting device. For example, a tilt adjusting device may be provided, via which the optical device may be inclined relative to the mounting point of a mounting device of long-range optical device 1. One such example is illustrated in FIG. 8 in form of a spotting scope 110. Spotting scope 110 is equipped with a mounting device 11 in form of a tripod foot. By means of an adjustment actuatable via an adjusting wheel 51, the inclination of mounted spotting scope 110 may be altered. Even such a manually operable adjusting device 5 which moves the optical unit as a whole may be equipped with a position detection unit 9 according to the example shown in FIG. 4, and can be used to alter or configure the settings of electronic functions of long-range optical device 1, or here specifically of spotting scope 110.

The figures only show exemplary embodiments, also with respect to the adjusting device illustrated. Of course it is likewise possible to use other adjusting devices which mechanically act on the optical unit, such as a diopter adjustment, a parallax compensation means, a reticle adjusting device, an elevation/windage turret adjustment or adjustment turret adjusting device in case of rifle scopes, a diaphragm adjusting device, or a zoom adjusting device.

It is understood that the foregoing description is that of the preferred embodiments of the invention and that various changes and modifications may be made thereto without departing from the spirit and scope of the invention as defined in the appended claims.

LIST OF REFERENCE NUMERALS

1 Long-range optical device
2 Optical unit
3 Eyepiece
4 Objective lens
5 Manually operable adjusting device
6 Second manually operable adjusting device
7 Electronic unit
9, 10 Position detection units
11 Mounting device
13, 14 Manually operable switch
15 Signaling unit
17 Object
18 Prism system
19 Focusing lens
20 Optical axis
21, 22 Lenses
24 Intermediate image plane
26 Eye
28 Position sensor
29 Motion sensor
51 Adjusting wheel
52 Threaded rod
53 Transmission arm
61 Folding bridge
71 Memory
91 Sliding contact
92 Contact surfaces
100 Binocular device
101, 102 Tubes of 100
105 Rifle scope
106 Tube
107 Adjustable optical components
108 Lens erection system
109 Adjustment turret
111 Rotary element
110 Spotting scope
113 First image plane
114 Second image plane
115, 116 Field stop
117, 118 Reticles
120 Aperture stop
150 Visual display
151, 152, 153 Menu items
610, 611 Arms of 61
1531, 1532,
1533, 1534, Setting parameter selection fields

What is claimed is:

1. A long-range optical apparatus comprising:
an optical unit including a plurality of optical elements and an ocular;
a mounting device;
at least one manually operable adjusting device for adjusting said optical unit and configured to adjust at least one of said optical unit and at least one of said optical elements relative to said mounting device;
an electronic unit having a storage medium configured to store a setting parameter of an electronic function;
said manually operable adjusting device being mechanically coupled to at least one of said mounting device and at least one of said optical elements;
said electronic unit being configured to execute said electronic function in dependence upon said setting parameter;
an electrical position detection unit adapted to detect the position of a movable part of said manually operable adjusting device;
said manually operable adjusting device being coupled to said electrical position detection unit such that an actuation of said manually operable adjusting device triggers an electrical signal of said electrical position detection unit in dependence upon the position of said manually operable adjusting device; and, said electronic unit being configured i) to store or modify said setting parameter in said storage medium in dependence upon said electrical signal of said electrical position detection unit and ii) to turn into a selection mode by actuating a switch, for selecting said setting parameter of said electronic function by selection or menu items.

2. The long-range optical apparatus of claim 1, wherein said manually operable adjusting device includes at least one of a focusing wheel, a dioptric adjustment unit, a parallax compensation unit, a reticle adjusting device, an elevation/windage turret adjustment, a folding bridge, a diaphragm adjusting unit, and a zoom adjusting unit.

3. The long-range optical apparatus of claim 1, wherein:
said electronic unit is enabled in a setting mode for setting said setting parameter and is configured to switch into said setting mode in response to an electrical activation signal; and,
said electronic unit being further configured to be activated to detect said electrical signal of said position detection unit when said electronic unit is in said setting mode.

4. The long-range optical apparatus of claim 3 further comprising a manually actuable switch configured to generate said electrical activation signal.

5. The long-range optical apparatus of claim 3, wherein:
said electronic unit defines a selection mode and is configured to switch into said selection mode in response to said electrical activation signal;
said electronic unit being further configured to store parameters of different electronic functions in response to at least one further electrical activation signal in combination with at least one of the electrical signals of said electrical position detection unit.

6. The long-range optical apparatus of claim 5 further comprising a switch configured to cause said electrical activation signal when actuated; and, wherein said electronic unit is configured to switch into said selection mode in response to said electrical activation signal.

7. The long-range optical apparatus of claim 1 further comprising a manually operable switch configured to, when actuated, confirm the setting of said setting parameter.

8. The long-range optical apparatus of claim 1 further comprising:
a signaling unit connected to said electronic unit or being a component of said electronic unit;
said signaling unit being one of an acoustic signaling unit and an optical signaling unit; and,
said electronic unit being configured to signal a change of said setting parameter via said signaling unit.

9. The long-range optical apparatus of claim 8, wherein said signaling unit includes a visual display configured to be visible in at least one beam path of the long-range optical apparatus.

10. The long-range optical apparatus of claim 1, wherein said manually operable adjusting device is a first manually operable adjusting device; said electrical position detecting unit is a first electrical position detecting unit; said electrical signal is a first electrical signal; the long-range optical apparatus further comprising:
a second manually operable adjusting device for adjusting said optical unit;
a second electrical position detection unit coupled to said second manually operable adjusting device such that an actuation of said second manually operable adjusting device triggers said second electrical position detection unit to output a second electrical signal in dependence upon the position of said second manually operable adjusting device; and,
said electronic unit being further configured to store or modify said setting parameter in said storage medium in dependence upon both said first and second electrical signals.

11. The long-range optical apparatus of claim 1, wherein said electronic unit is configured to modify at least one of the following setting parameters in response to an actuation of said manually operable adjusting device:
a default brightness of an optical display;
a maximum brightness of an optical display;
a minimum brightness of an optical display;
brightness levels of an optical display;
a switchover of units, preferably distance units, preferably from meters to feet or yards, or of angular units;
a setting or selection of a ballistic curve;
a time indication;
radio transmission settings; and,
settings for at least one of wireless transmission of data and wireless reception of data.

12. The long-range optical apparatus of claim 1, wherein said position detection unit includes at least one of:
a switch;
a sliding contact switch;
a sliding contact switch having a plurality of switch contact surfaces;
an optical sensor;
a magnetic sensor; and,
a capacitive sensor.

13. The long-range optical apparatus of claim 1 further comprising:
an optical display controlled by said electronic unit and being configured to be visible in at least one beam path of the long-range optical apparatus and to display at least one menu having at least one selection field;
at least one sensor configured to output a sensor signal;
said electronic unit is further configured to control said optical display in response to said sensor signal such that a selection or activation of one said selection fields is changed.

14. The long-range optical apparatus of claim 13, wherein said sensor is a position sensor.

15. The long-range optical apparatus of claim 13, wherein said sensor is a motion sensor.

* * * * *